United States Patent [19]

Cavicchio

[11] 4,308,070

[45] Dec. 29, 1981

[54] ASBESTOS-FREE COMPOSITION FOR MILLBOARD FOR USE AT HIGH TEMPERATURES

[75] Inventor: Ernest A. Cavicchio, Erie, Pa.

[73] Assignee: GAF Corporation, New York, N.Y.

[21] Appl. No.: 163,259

[22] Filed: Jun. 26, 1980

[51] Int. Cl.³ .............................................. C04B 7/353
[52] U.S. Cl. .................................... 106/93; 106/99
[58] Field of Search ................................ 106/93, 99

[56] References Cited

U.S. PATENT DOCUMENTS

| | | | |
|---|---|---|---|
| 3,438,853 | 4/1969 | Haines et al. | 106/93 |
| 3,841,885 | 10/1974 | Jakel | 106/93 |
| 4,040,851 | 8/1977 | Ziegler | 106/93 |
| 4,101,335 | 7/1978 | Barrable | 106/99 |

*Primary Examiner*—James Poer
*Attorney, Agent, or Firm*—Sheldon H. Parker; James Magee, Jr.

[57] ABSTRACT

An asbestos-free millboard formulation is provided which includes from about 5 to 20% of a cellulosic fiber, from 40 to 15% barytes, from 10 to 50% cement and from 15 to 40% of an inorganic filler selected from the group consisting of talc, diatomaceous earth, silicates, carbonates and mixtures thereof. The formulation can be processed on conventional millboard manufacturing equipment.

14 Claims, No Drawings

ASBESTOS-FREE COMPOSITION FOR MILLBOARD FOR USE AT HIGH TEMPERATURES

BACKGROUND OF THE INVENTION

1. Field of the Invention

This invention relates to a composition for a millboard material, and more particularly, to a nonasbestos formulation for a high temperature millboard.

2. Description of the Prior Art

Millboard has come into common use over the past years for a variety of applications. For example, it can be used in gasket applications, thermal insulation and Lehr roll fabrication. Typical millboard formulations employ asbestos fiber, typically in combination with other heat resistant fibers or fillers and binders and are capable of withstanding exposure to temperatures, such as 900° to 1,000° F. without injury. The millboard is typically by water-laying or paper-making processes.

However, asbestos in all forms and uses has become suspect of creating health hazards during processing and to the end user. The large existing investments in processing equipment and the high cost of change dictates that substitutes for asbestos must be capable of being processed on existing equipment. The need in numerous applications for millboard to withstand high temperatures, necessitates that the substitute be predominately or entirely an inorganic fiber due to the low combustion temperature of organic fibers. While glass fiber would appear to be a reasonable substitute for asbestos fiber, processing requirements and end product properties have not been successfully fulfilled by this substitution.

SUMMARY OF THE INVENTION

It has now been found that the desired millboard properties can be attained through the use of a small quantity of an organic fiber to facilitate processing and inorganic fillers and binders. In accordance with the present invention, an asbestos-free millboard formulation is provided which includes from about 5 to 20% of a cellulosic fiber, from 40 to 15% barytes, from 10 to 50% cement and from 15 to 40% of an inorganic filler selected from the group consisting of talc, diatomaceous earth, silicates, carbonates and mixtures thereof.

DESCRIPTION OF THE PREFERRED EMBODIMENTS

The prior art asbestos formulations are frequently predominately asbestos fiber. Nevertheless, it has been found that processing on conventional asbestos papermaking equipment is feasible even at fiber concentrations as low as 5%. The fiber is a cellulosic fiber, such as a sulfite pulp obtained by digestion of a coniferous wood with magnesium, ammonium, or calcium disulfite containing free sulfur dioxide. The essential ingredient in the formulation is barium sulphate, a natural material, available, for example, in a fine particle size pigment grade from Whittaker, Clark & Daniels Company under the trademark #290L0 Micron. The filler can be talc, diatomaceous earth, silicates or carbonates, but talc and diatomaceous earth are preferred. The preferred binder for the system is Portland Cement in a range from about 10 to 50%. In those instances where dusting is a problem, a small quantity of a latex binder can be used. The latex formulation is not narrowly critical since it is employed predominately as a mechanism for inhibiting dusting, rather than as a binder. Since it is an organic component, the minimum amount should be used and in combination with other organic components, should not produce a formulation having greater than about 20% (on a dry weight basis) of organic constitutents. Representative of the latexes which can be used are styrene-butadiene copolymers, polychloroprene, acrylonitrilebutadiene copolymers, ethylene-propylene-diene copolymers, and isobutylene-isoprene copolymers.

The range of materials which can be used is from 5 to 20% cellulosic fiber, 10 to 50% inorganic filler and 0-15% latex.

A preferred formulation includes from about 5 to 10% bleached sulphite pulp, and 20 to 25% Portland Cement. In all instances, reference to percentages intend to indicate weight percents on a dry weight basis.

The use of from 30 to 40% barytes and 30 to 40% diatomaceous earth or talc is preferred in the foregoing formulations.

Two typical, preferred formulations are:
10% bleached sulphite pulp
20% Portland Cement
35% barytes
35% diatomaceous earth, and
5% bleached sulphite pulp
25% Portland Cement
35% barytes
35% diatomaceous earth The foregoing formulations produce millboard having a density of about 50 lbs. per cubic foot, from 5 to 30% compressibility at 1,000 p.s.i., a recovery from compression of at least 30% and no greater than 20% ignition loss at about 1,500° F.

The millboard can be rigid or semiflexible and typically is used in thickness in the range from about an inch to about one-half inch. Uses of the millboard include fire barriers or heat shields between woodburning stoves or ovens and furnaces in general, as well as various gasket applications. The formulation of the instant invention has been found to have utility in essentially the full range of millboard applications and can be formulated on existing commercial equipment, using the existing manufacturing technique which is well kown in the art.

The absence of asbestos from the formulation has not adversely affected the economics of the systems, the manufacturing processes or the resultant products physical properties.

What is claimed is:

1. An asbestos-free milboard comprising from about
5 to 20% cellulosic fibers,
10 to 50% inorganic binder,
40 to 15% barytes, and
40 to 15% inorganic filler,
said percentages being on a dry weight basis.

2. The asbestos-free millboard of claim 1, wherein said cellulosic fibers are a bleached sulphite pulp.

3. The asbestos-free millboard of claim 1, wherein said inorganic binder is Portland Cement.

4. The asbestos-free millboard of claim 3, wherein said Portland Cement is present in an amount from about 20 to 25%.

5. The free millboard of claim 1, wherein said barytes is present in an amount from about 30 to 40%.

6. The asbestos-free millboard of claim 1, wherein said inorganic filler is selected from the group consisting of diatomaceous earth, silicates, carbonates and mixtures thereof.

7. The asbestos-free millboard of claim 6, wherein said inorganic filler is talc.

8. The asbestos-free millboard of claim 6, wherein said inorganic filler is diatomaceous earth.

9. The asbestos-free millboard of claim 7, wherein said talc is present in an amount from about 30 to 40%.

10. The asbestos-free millboard of claim 8, wherein said diatomaceous earth is present in an amount from about 30 to 40%.

11. The asbestos-free millboard of claim 1, wherein said millboard further includes up to about 15% of an organic latex.

12. The asbestos-free millboard of claim 11, wherein said organic latex is selected from the group consisting of styrene-butadiene copolymers, polychloroprene, acrylonitrilebutadiene copolymers, ethylene-propylene-diene copolymers, isobutylene-isoprene copolymers and mixtures thereof.

13. The asbestos-free millboard of claim 1, wherein said cellulosic fibers are present in an amount from 5 to 10%.

14. The asbestos-free millboard of claim 2, wherein said cellulosic fibers are present in an amount from 5 to 10%.

* * * * *